(12) United States Patent
Nakayama et al.

(10) Patent No.: US 12,178,383 B2
(45) Date of Patent: Dec. 31, 2024

(54) DETECTION DEVICE

(71) Applicant: Panasonic Intellectual Property Management Co., Ltd., Osaka (JP)

(72) Inventors: Hiroshi Nakayama, Osaka (JP); Mikiya Nakata, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/420,416

(22) Filed: Jan. 23, 2024

(65) Prior Publication Data

US 2024/0156313 A1  May 16, 2024

Related U.S. Application Data

(63) Continuation of application No. 17/858,639, filed on Jul. 6, 2022, now Pat. No. 11,918,171, which is a (Continued)

(30) Foreign Application Priority Data

Sep. 28, 2017 (JP) ................................. 2017-189134

(51) Int. Cl.
*A47L 7/00* (2006.01)
*A47L 9/08* (2006.01)
(Continued)

(52) U.S. Cl.
CPC .............. *A47L 7/0085* (2013.01); *A47L 9/08* (2013.01); *A47L 9/149* (2013.01); *A47L 9/16* (2013.01);
(Continued)

(58) Field of Classification Search
CPC ......... A47L 2201/022; A47L 2201/024; A47L 2201/04; A47L 7/0085; A47L 9/08;
(Continued)

(56) References Cited

U.S. PATENT DOCUMENTS 10,143,348 B2 * 12/2018 Machida ............... A47L 9/2805
2007/0163327 A1 * 7/2007 Mansson .................. G01N 1/40
73/104

(Continued)

FOREIGN PATENT DOCUMENTS

JP 60063499 A * 4/1985
JP 2005-265483 A 9/2005
(Continued)

OTHER PUBLICATIONS

International Search Report of PCT application No. PCT/JP2018/027783 dated Sep. 25, 2018.
(Continued)

*Primary Examiner* — Marc Carlson
(74) *Attorney, Agent, or Firm* — Rimon P.C.

(57) ABSTRACT

A detection system for detecting a virus or the like. The detection system includes an autonomous collection device that is capable of moving on a floor surface and for collecting an object on the floor surface, and a station device for detecting an analyte from the object collected from the floor surface by the autonomous collection device. The autonomous collection device includes a moving part for moving on the floor surface, a primary electric blower for sucking the object on the floor surface, and a dust container for storing the sucked object. The station device includes a transfer pipe fluidically connected to the dust container of the autonomous collection device when the autonomous collection device is positioned in a home position, and a
(Continued)

virus detection part for detecting the analyte from the object transferred from the dust container through the transfer pipe.

2 Claims, 17 Drawing Sheets

Related U.S. Application Data continuation of application No. 16/775,234, filed on Jan. 28, 2020, now Pat. No. 11,412,903, which is a continuation of application No. PCT/JP2018/027783, filed on Jul. 25, 2018.

(51) Int. Cl.
| | | |
|---|---|---|
| *A47L 9/14* | (2006.01) | |
| *A47L 9/16* | (2006.01) | |
| *A47L 9/28* | (2006.01) | |
| *A47L 9/30* | (2006.01) | |
| *G01N 35/00* | (2006.01) | |
| *G01N 35/08* | (2006.01) | |
| *G01N 35/10* | (2006.01) | |

(52) U.S. Cl.
CPC ............ *A47L 9/281* (2013.01); *A47L 9/2852* (2013.01); *A47L 9/2857* (2013.01); *A47L 9/30* (2013.01); *G01N 35/00732* (2013.01); *G01N 35/0099* (2013.01); *G01N 35/08* (2013.01); *G01N 35/1081* (2013.01); *A47L 2201/022* (2013.01); *A47L 2201/024* (2013.01); *A47L 2201/04* (2013.01); *G01N 2035/1053* (2013.01)

(58) Field of Classification Search
CPC .......... A47L 9/149; A47L 9/16; A47L 9/2805; A47L 9/281; A47L 9/2852; A47L 9/2857; A47L 9/2873; A47L 9/2889; A47L 9/30
See application file for complete search history.

(56) References Cited

U.S. PATENT DOCUMENTS

| | | | |
|---|---|---|---|
| 2016/0154996 A1* | 6/2016 | Shin ..................... | G06F 3/167 901/1 |
| 2018/0021942 A1* | 1/2018 | Hummel ............... | A47L 9/2852 700/253 |
| 2020/0163505 A1* | 5/2020 | Nakayama ......... | G01N 35/1081 |
| 2020/0170468 A1* | 6/2020 | Nakayama ............ | A47L 9/149 |
| 2020/0196812 A1* | 6/2020 | Takayanagi ........... | A47L 7/0061 |

FOREIGN PATENT DOCUMENTS

| | | | |
|---|---|---|---|
| JP | 2006071455 A | * | 3/2006 |
| JP | 2012052866 A | * | 3/2012 |
| JP | 2015-152491 A | | 8/2015 |
| JP | 2016-212063 A | | 12/2016 |
| JP | 2017-055834 A | | 3/2017 |
| WO | 2016/027745 A1 | | 2/2016 |

OTHER PUBLICATIONS

Non-Final Office Action dated Dec. 22, 2021 issued in U.S. Appl. No. 16/775,234.
Notice of Allowance dated Apr. 20, 2022 issued in U.S. Appl. No. 16/775,234.
Notice of Allowance dated Oct. 31, 2023 issued in U.S. Appl. No. 17/858,639.

* cited by examiner

```
                    ┌─────────┐
                    │  Start  │
                    └────┬────┘
                         │                        ~S101
            ┌────────────▼─────────────────────────────┐
            │ Dispersing the dry adsorbent on the floor surface │
            └────────────┬─────────────────────────────┘
                         │                        ~S102
            ┌────────────▼─────────────────────────────┐
            │    Sucking the object from the floor surface    │
            └────────────┬─────────────────────────────┘
                         │                        ~S103
            ┌────────────▼─────────────────────────────┐
            │         Returning to the home position          │
            └────────────┬─────────────────────────────┘
                         │                        ~S104
            ┌────────────▼─────────────────────────────┐
            │           Transferring the sucked object        │
            └────────────┬─────────────────────────────┘
                         │                        ~S105
            ┌────────────▼─────────────────────────────┐
            │              Detecting the virus                │
            └────────────┬─────────────────────────────┘
                         │
                    ┌────▼────┐
                    │   End   │
                    └─────────┘
```

Start

S201
Separating the object from air in the cyclone part

S202
Extracting the virus from the object into the extraction liquid

S203
Dropping the sample liquid onto the detection device

S204
Determining presence or absence of virus

End

FIG. 9

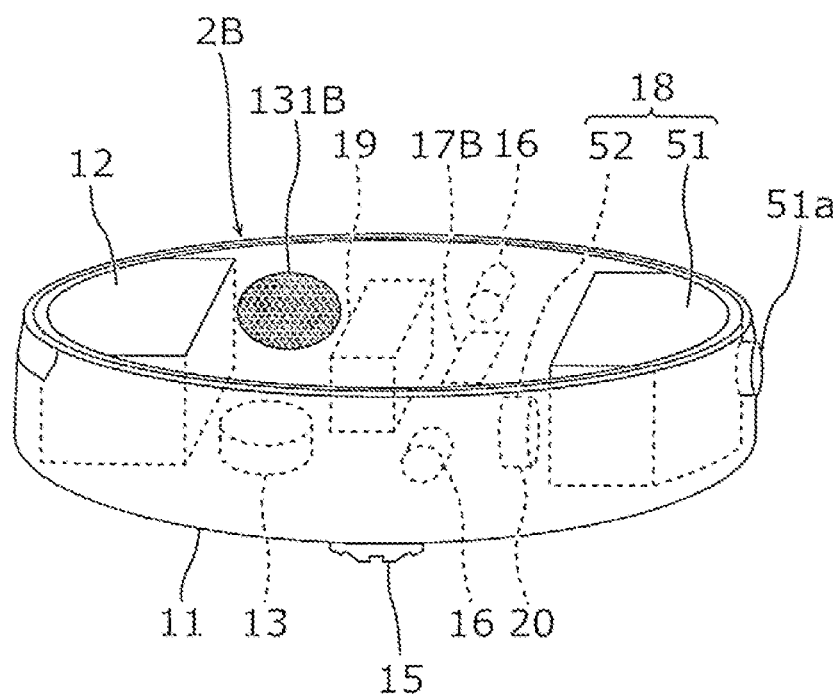
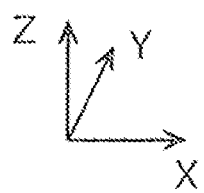
FIG. 13

DETECTION DEVICE

CROSS-REFERENCE TO RELATED APPLICATIONS

This application is a Continuation of U.S. patent application Ser. No. 17/858,639, filed on Jul. 6, 2022, which is a Continuation of U.S. patent application Ser. No. 16/775,234, filed on Jan. 28, 2020, now U.S. Pat. No. 11,412,903, which is a Continuation of International Patent Application No. PCT/JP2018/027783, filed on Jul. 25, 2018, which claims priority to Japanese Patent Application No. 2017-183134, filed on Sep. 28, 2017, the entire disclosures each of which are hereby incorporated by reference.

BACKGROUND

1. Technical Field

The present disclosure relates to a detection device for detecting an analyte such as a virus or a bacterium.

2. Description of the Related Art

Patent Literature 1 discloses a technique for detecting a virus in order to suppress an outbreak (namely, a pandemic) of infection of an influenza virus. In Patent Literature 1, the virus floating in the air in a building is collected.

CITATION LIST

Patent Literature

Patent Literature 1: Japanese Patent Application Publication No. 2012-052866A

SUMMARY

The present disclosure provides a detection device capable of detecting a virus effectively in order to suppress spread of infection of a virus.

The present disclosure provides a detection device for detecting an analyte, the detection device comprising:
  a collection device capable of autonomously moving on a floor surface and for collecting an object on the floor surface; and
  a detector for detecting the analyte from the object collected from the floor surface by the collection device,
  wherein
  the collection device comprises:
    a moving mechanism for moving on the floor surface,
    a suction part for sucking the object on the floor surface; and
    a storage part for storing the object sucked by the suction part, and
  the detector comprises:
    a transfer pipe that is connected fluidically to the storage part of the collection device when the collection device is located at a predetermined position; and
    a substance detection part for detecting the analyte from the object transferred from the storage part through the transfer pipe.

The present disclosure further provides a detector for detecting an analyte, the detector comprising:
  a transfer pipe that is connected fluidically to a storage part of a collection device when the collection device capable of moving autonomously on a floor surface and for collecting an object on the floor surface is located at a predetermined position; and
  a substance detection part for detecting the analyte from the object transferred from the storage part through the transfer pipe.

Note that these comprehensive or specific aspects may be realized by a method, an integrated circuit, a computer program, or a recording medium such as a computer-readable CD-ROM, or realized by an arbitrary combination of the method, the integrated circuit, the computer program, and the recording medium.

The detection device according to the present disclosure can effectively detect a virus.

BRIEF DESCRIPTION OF THE DRAWINGS

FIG. 7 is a flowchart of operation of the detection device according to the first embodiment.

FIG. 9 is a flowchart of operation of the virus detection part in the first embodiment.

FIG. 13 shows a schematic diagram of the autonomous collection device according to a third embodiment.

DETAILED DESCRIPTION OF THE EMBODIMENTS

Hereinafter, embodiments of the present disclosure will be described with reference to the drawings.

Examples of the analyte that can be detected in the present embodiment are viruses and bacteria.

First Embodiment

[Details of Detection Device]

Figure 1:
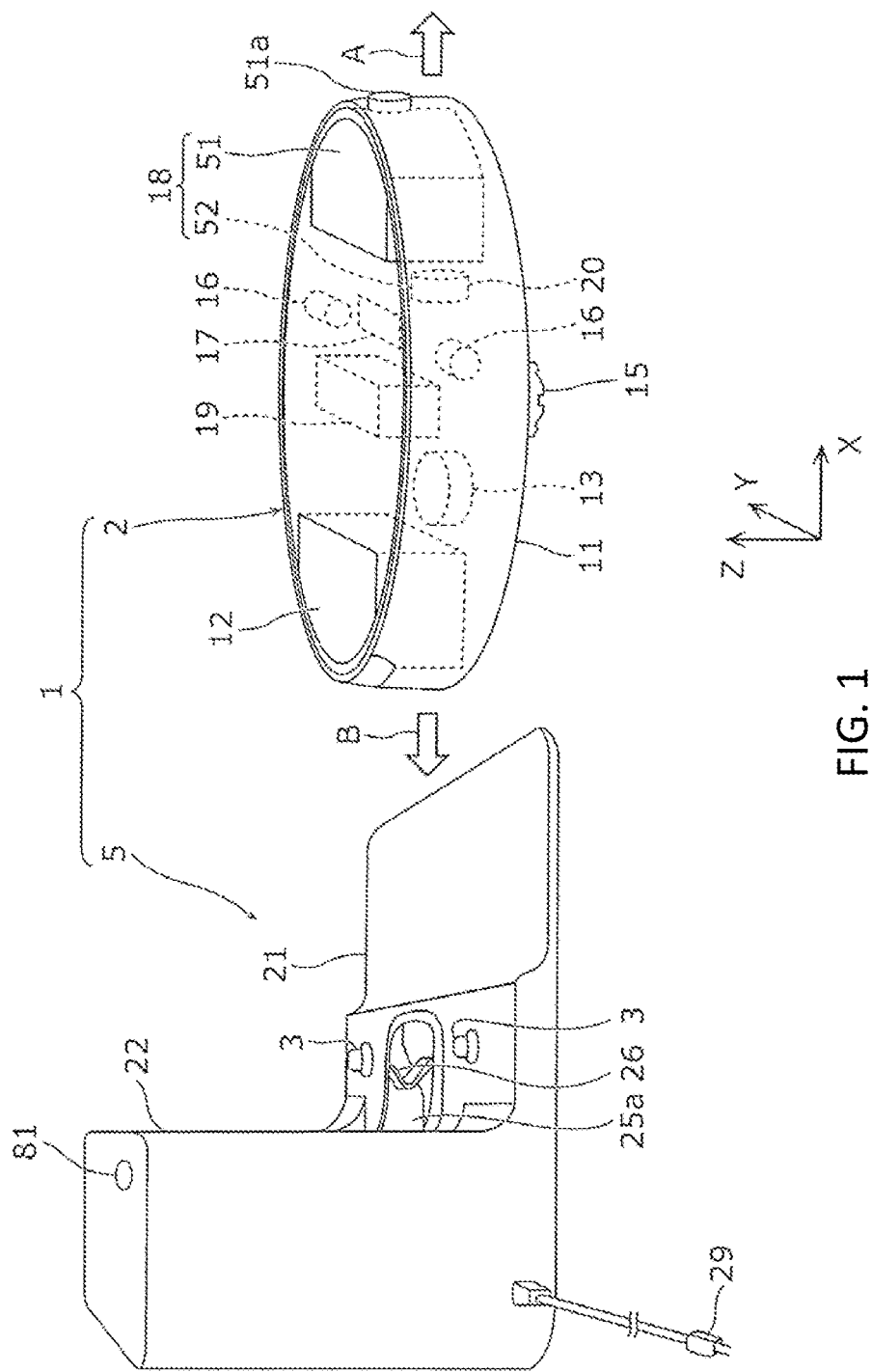
FIG. 1 shows a schematic diagram of a detection device according to a first embodiment.

FIG. 1 shows a schematic diagram of a detection device according to the first embodiment.

As shown in FIG. 1, the detection device 1 according to the first embodiment comprises an autonomous collection device 2 and a station device 5.

In the drawing, the X axis indicates the front-rear direction of the autonomous collection device 2. The Y axis indicates the width direction of the autonomous collection device 2. The Z axis indicates the height direction of the autonomous collection device 2. The Y axis is perpendicular to the X axis. The Z axis is also perpendicular to the X axis. The Z axis is also perpendicular to the Y axis. The arrow A indicates the forward direction of the autonomous collection device 2. The arrow B indicates the backward direction of the autonomous collection device 2. Dashed lines are used to represent internal structures that are basically invisible to the outside.

The autonomous collection device 2 is one example of a collection device. The autonomous collection device 2 is also referred to as a robot cleaner. The autonomous collection device 2 collects an object on the floor surface, while autonomously moving on the floor surface. After the collection, the autonomous collection device 2 autonomously returns to the station device 5. In the first embodiment, the autonomous collection device 2 moves forward to leave the station device 5. The autonomous collection device 2 moves backward to return to the station device 5.

The object on the floor surface is solid or liquid. An example of the solid object on the floor surface is a virus itself attached to the floor surface, dust to which the virus has adhered, or dry adsorbent. The dry adsorbent will be described later. An example of the liquid on the floor surface is saliva containing a virus. An example of the floor surface is a floor surface of a waiting room in a hospital, a floor surface of an immigration office at an airport, or a floor surface of a living room in a house.

The station device 5 is one example of a detector. The station device 5 is provided on the floor surface. The station device 5 charges the autonomous collection device 2 through charging electrodes 3, when the autonomous collection device 2 is located at the home position thereof. The station device 5 further transfers the object collected by the autonomous collection device 2 from the autonomous collection device 2 to the station device 5. Subsequently, the station device 5 detects a virus from the object transferred from the autonomous collection device 2.

[Details of Autonomous Collection Device]

Figure 2:
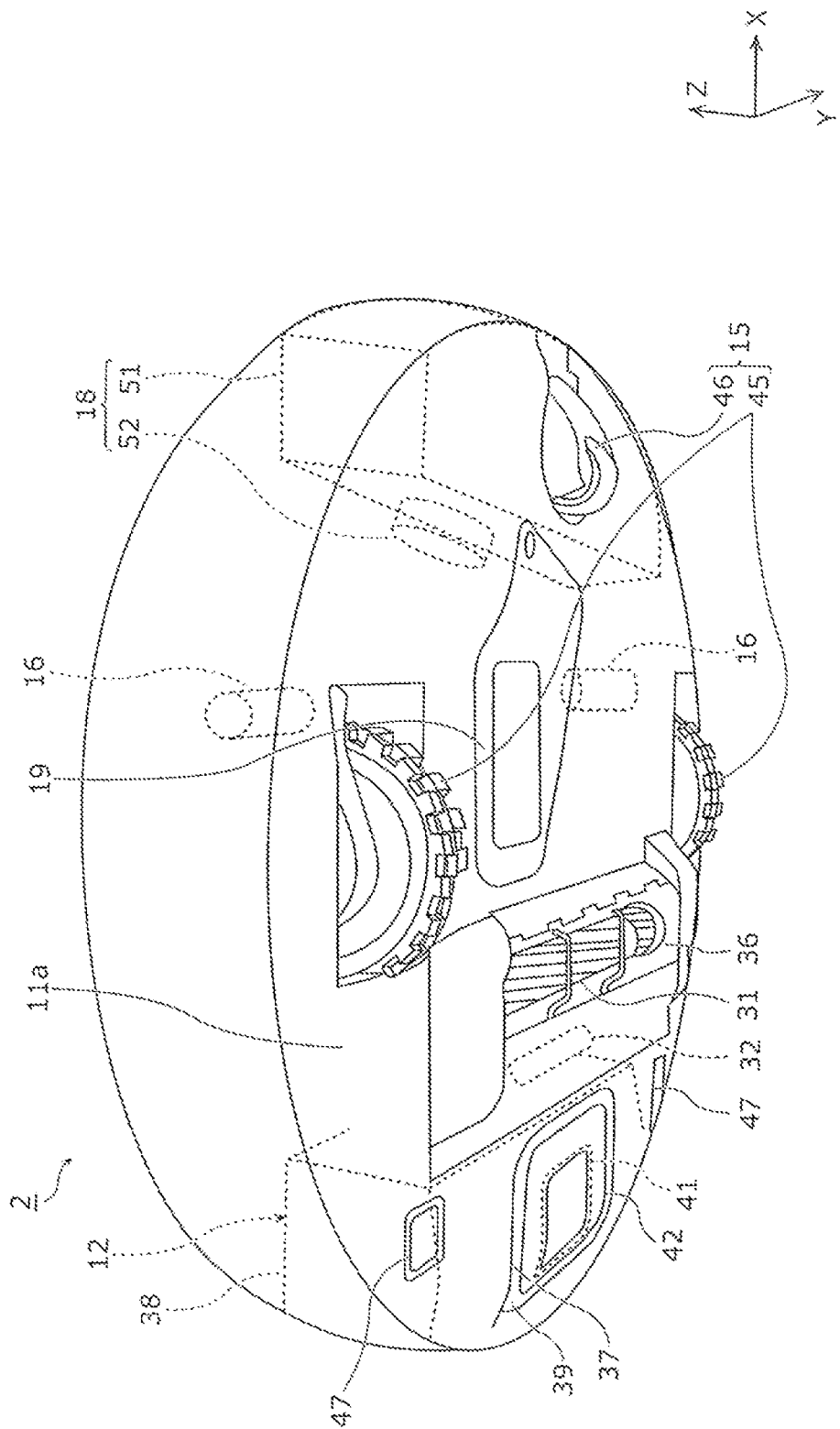
FIG. 2 shows a schematic view of a bottom surface of an autonomous collection device according to the first embodiment.

Next, the autonomous collection device 2 according to the first embodiment will be described in detail with reference to FIG. 1 and FIG. 2. FIG. 2 shows a schematic view of a bottom surface of the autonomous collection device according to the first embodiment.

As shown in FIG. 1, the autonomous collection device 2 comprises a main body case 11, a dust container 12, a primary electric blower 13, a moving part 15, a drive part 16, a robot control part 17, a drying part 18, and a secondary battery 19. Furthermore, as shown in FIG. 2, the autonomous collection device 2 comprises a center brush 31 provided on a bottom surface 11a of the main body case 11, and a center brush drive part 32 for driving the center brush 31. Hereinafter, the autonomous collection device 2 will be described in detail.

[Main Body Case]

The main body case 11 has a hollow disk shape. The main body case 11 is formed of, for example, synthetic resin. A horizontally long suction opening 36 extending in the width direction is provided at the center of a rear part of the bottom surface 11a of the main body case 11.

The suction opening 36 has a width of about two thirds of the width (namely, the diameter) of the main body case 11. The suction opening 36 is fluidically connected to the primary electric blower 13 through the dust container 12.

The main body case 11 has a dust container opening 37 on the bottom surface 11a. The dust container opening 37 is disposed in a part which is behind the suction opening 36 and covers a lower part of the dust container 12. The dust container opening 37 is a rounded rectangular opening. The dust container opening 37 partially exposes the dust container 12 attached to the main body case 11.

[Dust Container]

The dust container 12 is one example of a storage part for storing the object. In the first embodiment, the dust container 12 is detachably provided at the rear part of the main body case 11. The dust container 12 stores the object sucked from the suction opening 36 with a suction negative pressure generated by the primary electric blower 13. A filter or a separation device is applied to the dust container 12. The filter collects the object by filtering the air flowing together with the object. The separation device separates the object from the air by centrifugal separation (i.e., cyclone separation) or inertial separation of straight separation.

The dust container 12 is disposed behind the suction opening 36 and at the rear part of the main body case 11. The dust container 12 comprises a container main body 38 which is detachably provided on the main body case 11 and in which the object collected by the autonomous collection device 2 is stored, a connection part 39 that is exposed from the dust container opening 37 in a state of being attached to the main body case 11, a disposal opening 41 that is provided in the connection part 39 and through which the object in the container main body 38 is passed when the object is disposed of, and a disposal lid 42 for opening and closing the disposal opening 41.

[Primary Electric Blower]

The primary electric blower 13 is one example of the suction part for sucking the object on the floor surface. The primary electric blower 13 is contained in the main body case 11 and connected to the dust container 12. The primary electric blower 13 sucks the object on the floor surface from the suction opening 36 through the dust container 12.

[Moving Part]

The moving part 15 is one example of a moving mechanism for moving on the floor surface. The moving part 15 moves the autonomous collection device 2 on the floor surface. Specifically, the moving part 15 comprises a pair of left and right drive wheels 45 and a turning wheel 46.

The pair of the drive wheels 45 is disposed on the bottom surface 11a of the main body case 11 and protrudes from the bottom surface 11a. Accordingly, the pair of the drive wheels 45 are grounded to the floor surface in a state where the autonomous collection device 2 is placed on the floor surface. The pair of the drive wheels 45 are disposed at a substantially central part of the main body case 11 in the front-rear direction of the main body case 11, and are disposed on the left and right side parts in the width direction of the main body case 11. Each rotation shaft of the pair of the drive wheels 45 is disposed in parallel to the width direction of the main body case 11. The autonomous collection device 2 moves forward or backward by rotating the pair of the drive wheels 45 in the same direction. The autonomous collection device 2 turns clockwise or counterclockwise by rotating the pair of the drive wheels 45 in directions opposite to each other.

The turning wheel 46 is a rotatable carrying wheel. The turning wheel 46 is disposed at a substantially central part in the width direction of the bottom surface 11a of the main body case 11 and at the front part of the main body case 11.

[Drive Part]

The drive part 16 drives the moving part 15. Specifically, the drive part 16 is a pair of electric motors connected to the pair of the drive wheels 45. The drive part 16 drives the pair of the drive wheels 45 independently.

[Robot Control Part]

The robot control part 17 is contained in the main body case 11. The robot control part 17 controls the drive part 16 to autonomously move the autonomous collection device 2 on the floor surface.

Specifically, the robot control part 17 comprises a microprocessor (not shown) and a memory device (not shown) that stores various calculation programs and parameters executed by the microprocessor. The robot control part 17 is electrically connected to the primary electric blower 13, the center brush drive part 32, the drive part 16, and the drying part 18.

[Drying Part]

The drying part 18 dries the object that has the virus and moisture and is on the floor surface. In other words, the drying part 18 decreases the amount of water contained in the object. In the first embodiment, the drying part 18 comprises a dry adsorbent container 51 and a dry adsorbent dispersion means 52.

The object is, for example, dust to which saliva containing a virus has adhered. Further, for example, the object may be saliva itself. Further, for example, the object may be a dry adsorbent in which saliva has been absorbed.

The dry adsorbent container 51 is one example of the storage part for storing the dry adsorbent. The dry adsorbent container 51 is detachably provided at the front part of the main body case 11. An opening 51a is provided on the front surface of the dry adsorbent container 51. The dry adsorbent is dispersed from the opening 51a.

The dry adsorbent has a property of absorbing liquid. The dry adsorbent may have a property of absorbing the analyte. An example of the dry adsorbent is a superabsorbent polymer.

The dry adsorbent dispersion means 52 is one example of a dispersion part for dispersing the dry adsorbent onto the floor surface. The dry adsorbent dispersion means 52 is fluidically connected to the dry adsorbent container 51. The dry adsorbent dispersion means 52 disperses the dry adsorbent from the opening 51a of the dry adsorbent container 51 onto the floor surface in front of the autonomous collection device 2 by sending air into the dry adsorbent container 51. An example of the dry adsorbent dispersion means 52 is a blower.

[Secondary Battery]

The secondary battery 19 is a power source of the autonomous collection device 2. The secondary battery 19 is contained in the main body case 11. The secondary battery 19 is a power source for the primary electric blower 13, the center brush drive part 32, the drive part 16, the robot control part 17, and the drying part 18. For example, the secondary battery 19 is disposed between the turning wheel 46 and the suction opening 36. The secondary battery 19 is electrically connected to a pair of charging terminals 47 arranged on the bottom surface 11a of the main body case 11. The secondary battery 19 is charged when the charging terminals 47 are electrically connected to the charging electrodes 3 of the station device 5.

The center brush 31 is provided in the vicinity of the suction opening 36. The center brush 31 is an axial brush that can rotate around a rotation center line extending in the width direction of the main body case 11. The center brush 31 comprises, for example, a long shaft part (not shown) and a plurality of brushes (not shown) that extend in the radial direction of the shaft part and are helically arranged along the longitudinal direction of the shaft part. The center brush 31 is provided in a recess part having the suction opening 36. The center brush 31 protrudes downward from the bottom surface 11a of the main body case 11. In a state where the autonomous collection device 2 is placed on the floor surface, at least one of the plurality of brushes included in the center brush 31 is in contact with the floor surface.

The center brush drive part 32 is contained in the main body case 11. In the first embodiment, the center brush drive part 32 is an electric motor for rotating the center brush 31.

[Details of Station Device]

Figure 3:
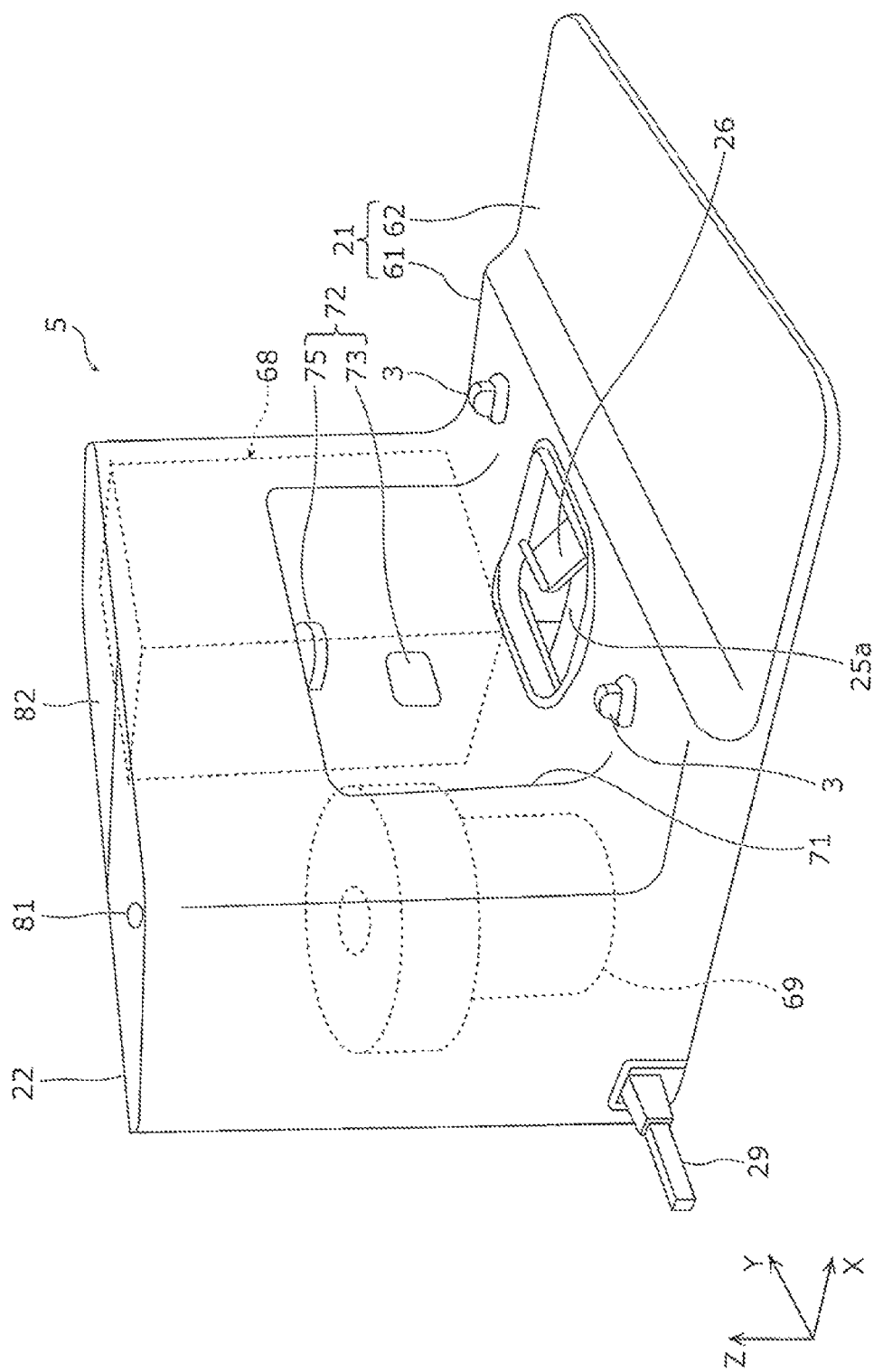
FIG. 3 shows a schematic diagram of a station device according to the first embodiment.

Next, the station device 5 according to the first embodiment will be described in detail with reference to FIG. 1 and FIG. 3. FIG. 3 shows a schematic diagram of the station device according to the first embodiment.

As shown in FIG. 1 and FIG. 3, the station device 5 comprises a pedestal 21, a housing 22, and a power cord 29 through which power from a commercial AC power supply passes.

The pedestal 21 is disposed on the front side of the station device 5, protrudes from the housing 22, and expands in a rectangular shape. The pedestal 21 comprises a high floor surface part 61 projecting from the bottom of the housing 22 and a low floor surface part 62 projecting from the high floor surface part 61. The low floor surface part 62 and the high floor surface part 61 extend in a strip shape along the width direction of the station device 5. The pair of charging electrodes 3, an inlet 25a of the transfer pipe 25, and a lever 26 are disposed on the high floor surface part 61.

The pair of the charging electrodes 3 are arranged so as to sandwich the inlet 25a of the transfer pipe 25 therebetween. The pair of the charging electrodes 3 are disposed in front of the left and right edges of a recess part 71. The autonomous collection device 2 reaches the home position in such a way that the pair of the drive wheels 45 rides on the low floor surface part 62 and that the dust container 12 is positioned above the high floor surface part 61.

The home position means a position where the autonomous collection device 2 is electrically connected to the charging electrodes 3 of the station device 5. The autonomous collection device 2 autonomously returns to this home position in at least one of a case where charging is necessary and a case where cleaning of the floor surface is completed.

The housing 22 is positioned at the rear side part of the station device 5, extends upwards beyond the pedestal 21, and has a rounded rectangular shape. The front wall of the housing 22 comprises the recess part 71 which has a shape of an arc and corresponds to the rear end part of the autonomous collection device 2. The inlet 25a of the transfer pipe 25 extends from the high floor surface part 61 of the pedestal 21 to the recess part 71.

The recess part 71 is provided with a detection part 72 for detecting whether or not the autonomous collection device 2 has reached the home position. The detection part 72 is an objective sensor for detecting the relative distance from the autonomous collection device 2 using visible light or infrared light. The detection part 72 comprise a first sensor part 73 for detecting a relative distance from the autonomous collection device 2 in the front direction of the housing 22 and a second sensor part 75 for detecting a relative distance from the autonomous collection device 2 in the height direction of the housing 22. In FIG. 1 and FIG. 3, the front direction of the housing 22 is the X direction. The height direction of the housing 22 is the Z direction.

The housing 22 comprises a lid 82 for covering a virus detection part 68 contained in the housing 22. The lid 82 opens and closes a part of the ceiling of the housing 22, specifically, the right half thereof. The virus detection part 68 is disposed below the lid 82.

Further, a lamp 81 is provided on the top surface of the housing 22. The lamp 81 is one example of a presentation part for presenting a detection result provided by the virus detection part 68. The lamp 81 is lit in a manner corresponding to the detection result. For example, the lamp 81 is turned on when a virus is detected, and turned off when no virus is detected. Alternatively, the lamp 81 emits red light when a virus is detected, and emits green light when no virus is detected. In place of these, the lamp 81 blinks when a virus is detected and does not blink when no virus is detected. In place of the lamp 81, for example, the station device 5 may display the detection result using a display. Alternatively, the station device 5 may output a sound which notify provision of a detection result using a speaker. Specifically, the station device 5 may output a warning sound when a virus is detected. The station device 5 does not have to present the detection result. The station device 5 may transmit data of the detection result to another device.

[Inside of Case]

Figure 4:
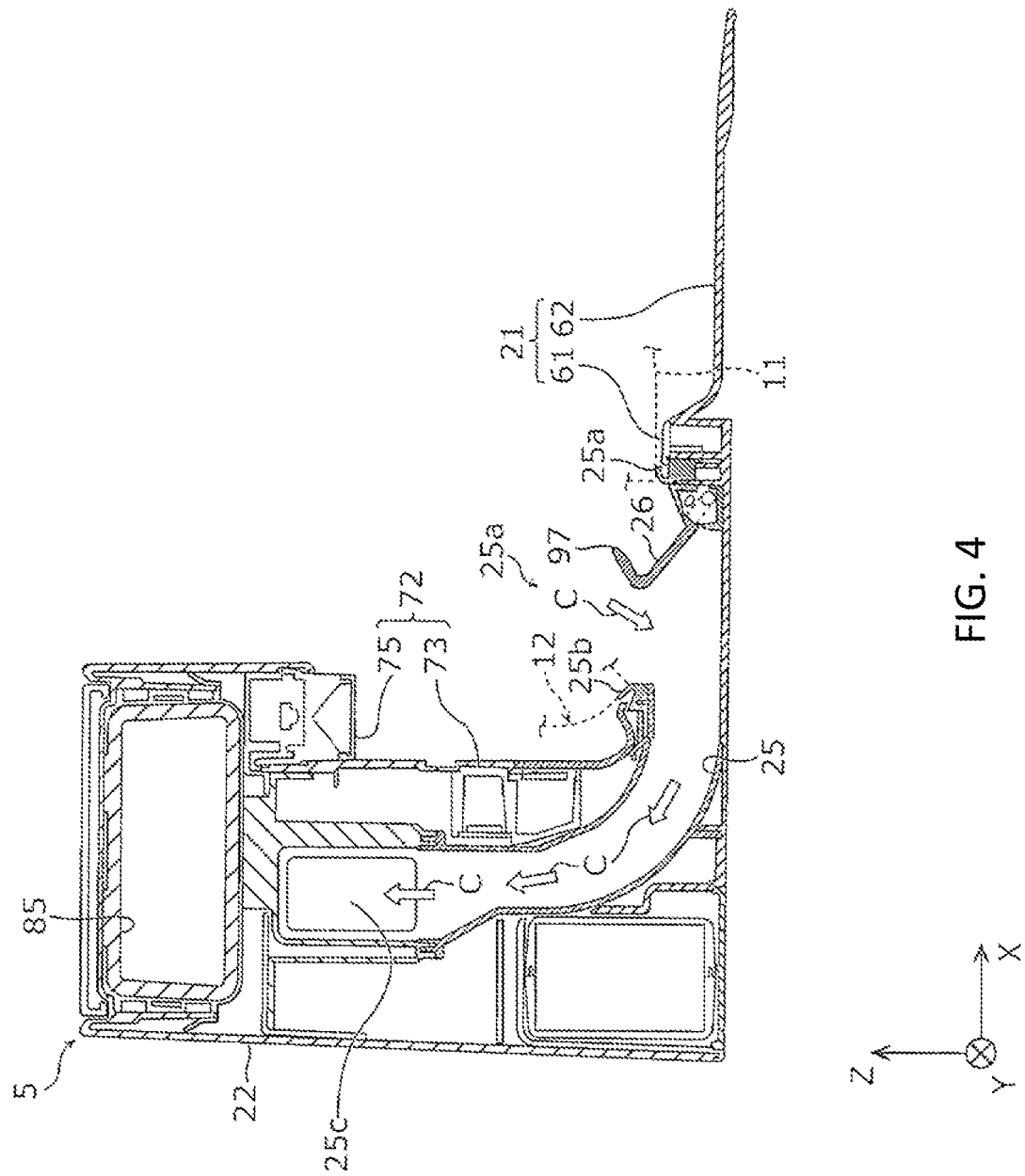
FIG. 4 shows a vertical cross-sectional view of the station device according to the first embodiment.
Figure 5A:
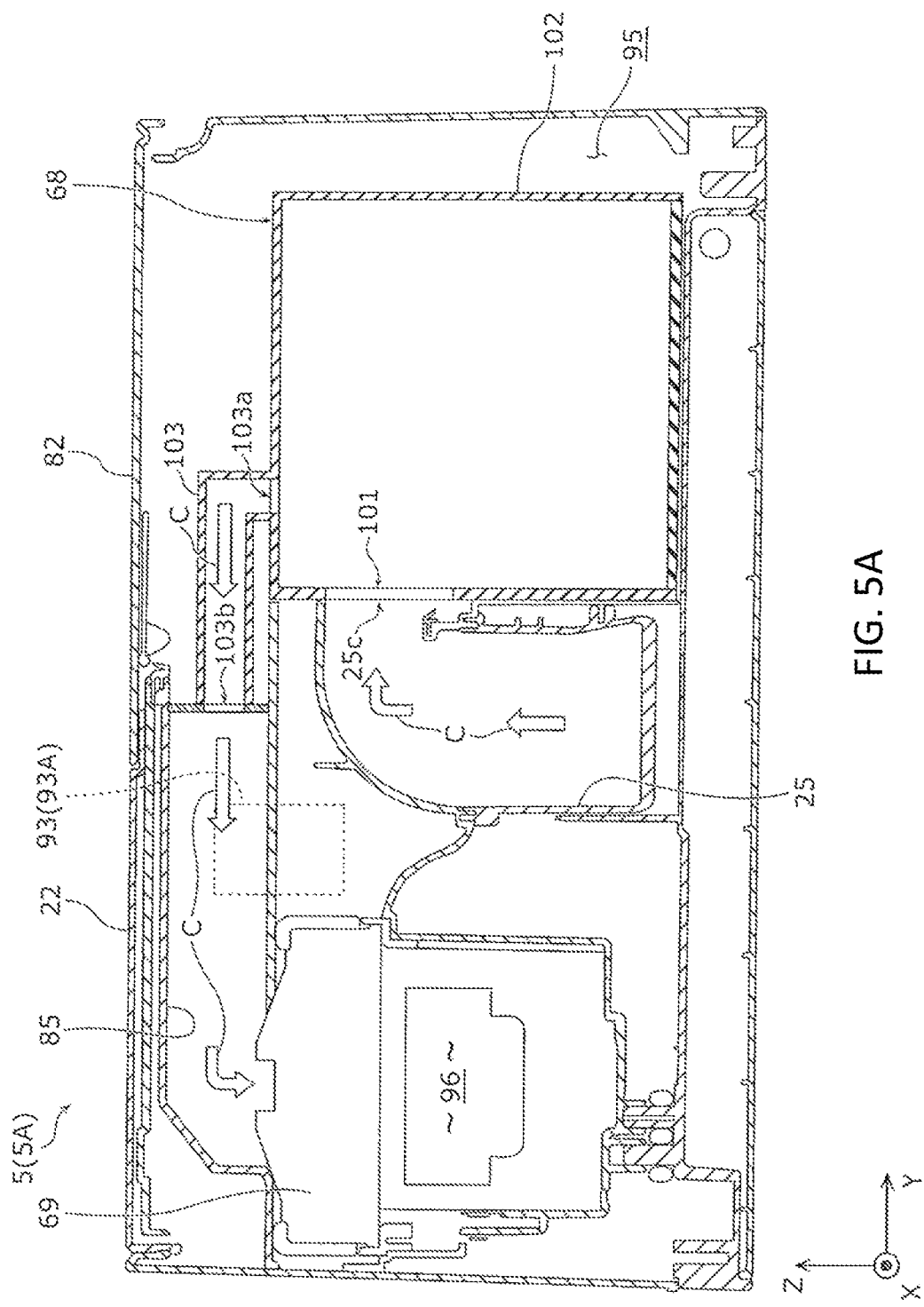
FIG. 5A shows a transverse cross-sectional view of the station device according to the first embodiment.

Here, the inside of the housing 22 will be described in detail with reference to FIG. 4 and FIG. 5A. FIG. 4 shows a vertical cross-sectional view of the station device according to the first embodiment. FIG. 5A shows a transverse cross-sectional view of the station device according to the first embodiment. In FIG. 5A, the inside of the virus detection part 68 is omitted.

As shown in FIG. 4 and FIG. 5A, the housing 22 contains the transfer pipe 25, the virus detection part 68, a secondary electric blower 69, a downstream pipe 85, and a control part 93. The lid 82 is attached to the housing 22. As shown in FIG. 5A, the housing 22 has, on the right side thereof, a detection part chamber 95 that contains the virus detection part 68. The housing 22 has, on the left side thereof, a blower chamber 96 that contains the secondary electric blower 69.

The virus detection part 68 is one example of a substance detection part for detecting the analyte from the object transferred from the dust container 12 of the autonomous collection device 2 through the transfer pipe 25. Details of the virus detection part 68 will be described later with reference to FIG. 6.

The secondary electric blower 69 sucks the object from the dust container 12 of the autonomous collection device 2 through the transfer pipe 25. Specifically, the secondary electric blower 69 is contained in the housing 22 in such a way that the suction opening of the secondary electric blower 69 faces the lid 82. The secondary electric blower 69 generates the suction negative pressure in the transfer pipe 25 through the virus detection part 68.

As shown in FIG. 4, the transfer pipe 25 extends rearward from the inlet 25a disposed in the high floor surface part 61 of the pedestal 21 and reaches the inside of the housing 22. The transfer pipe 25 is bent in the housing 22. The transfer pipe 25 extends upward between the detection part chamber 95 and the blower chamber 96 and reaches the side of the virus detection part 68. The transfer pipe 25 has the inlet 25a that opens toward a part located above the station device 5 and an outlet 25c that opens sideways toward the virus detection part 68.

An annular seal member 25b is provided at the inlet 25a of the transfer pipe 25. The annular seal member 25b is brought into contact with the connection part 39 of the dust container 12 and is airtightly connected to the disposal opening 41, when the autonomous collection device 2 is located at the home position. The seal member 25b is in close contact with the connection part 39 in a state where the autonomous collection device 2 is located at the home position.

The lever 26 disposed at the inlet 25a of the transfer pipe 25 comprises a hook 97 which extends in the front direction of the housing 22 and upward. The lever 26 mechanically opens and closes the disposal lid 42 of the autonomous collection device 2 using the hook 97.

The virus detection part 68 comprises a detection part housing 102. A discharge pipe 103 is connected to the opening on the top surface of the detection part housing 102. A suction opening 101 is provided on the side surface of the detection part housing 102. The inside of the virus detection part 68 will be described later with reference to FIG. 6.

An inlet 103a of the discharge pipe 103 is connected to an opening on the top surface of the detection part housing 102. An outlet 103b of the discharge pipe 103 is connected to the inlet of the downstream pipe 85.

The downstream pipe 85 is an air passage on the suction side of the secondary electric blower 69. The downstream pipe 85 is disposed above the transfer pipe 25 and extends in the width direction in the housing 22. The inlet of the downstream pipe 85 is connected to the outlet 103b of the discharge pipe 103 of the virus detection part 68. The outlet of the downstream pipe 85 is connected to the suction opening of the secondary electric blower 69.

The lid 82 is provided swingably on the top surface of the housing 22. The lid 82 opens and closes the opening on the top surface of the detection part chamber 95 that contains the virus detection part 68.

When the autonomous collection device 2 returns to the home position of the station device 5, the charging terminals 47 of the autonomous collection device 2 are electrically connected to the charging electrodes 3 of the station device 5. At this time, the inlet 25a of the transfer pipe 25 of the station device 5 is connected to the connection part 39 of the dust container 12 of the autonomous collection device 2. After that, the control part 93 of the station device 5 drives the secondary electric blower 69 to suck air in the direction of the arrow C included in FIG. 4 and FIG. 5A, and to move the object from the dust container 12 to the virus detection part 68.

[Inside of Virus Detection Part]

Figure 6:
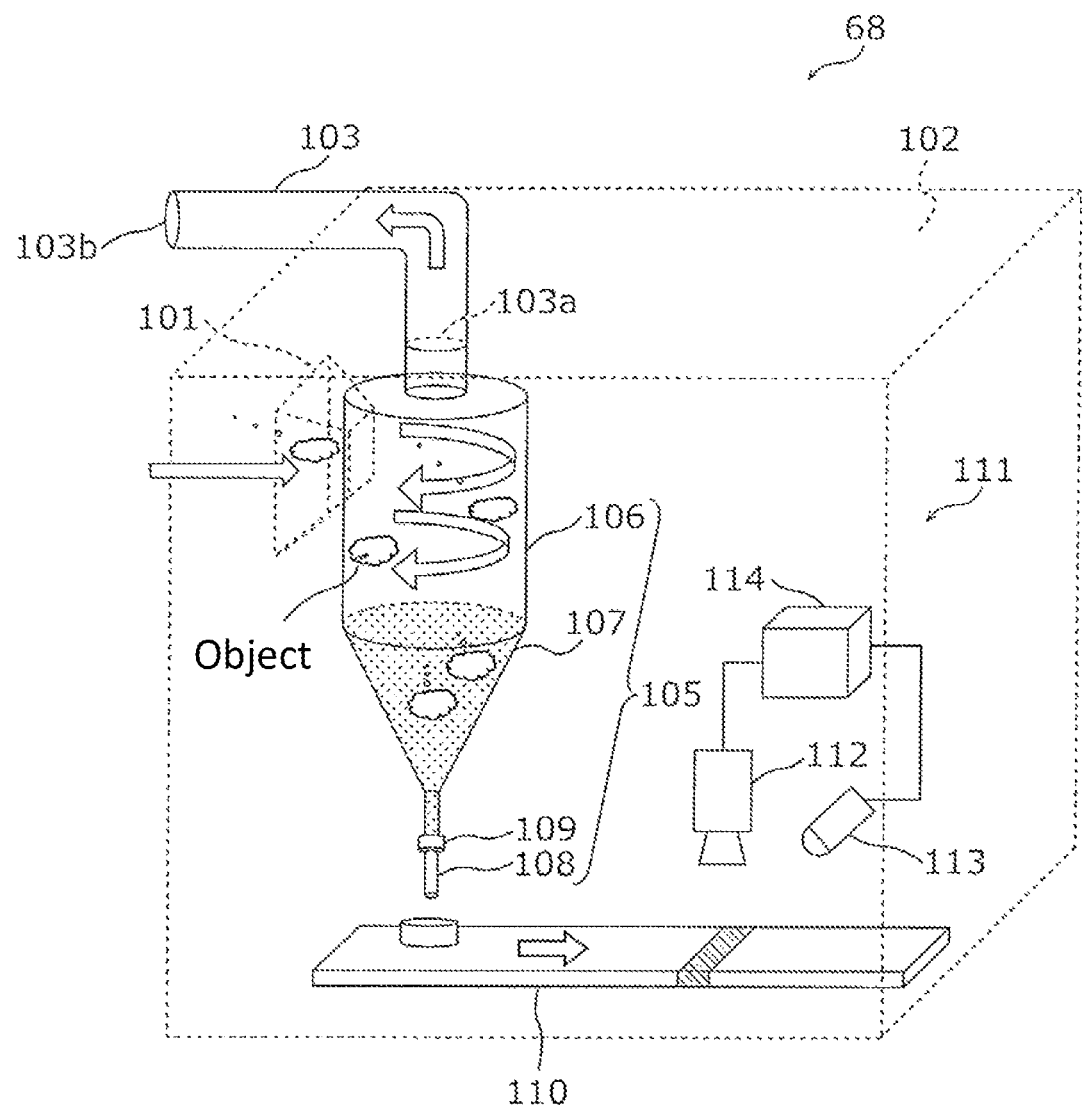
FIG. 6 shows a schematic diagram of an internal structure of a virus detection part in the first embodiment.
Figure 8:
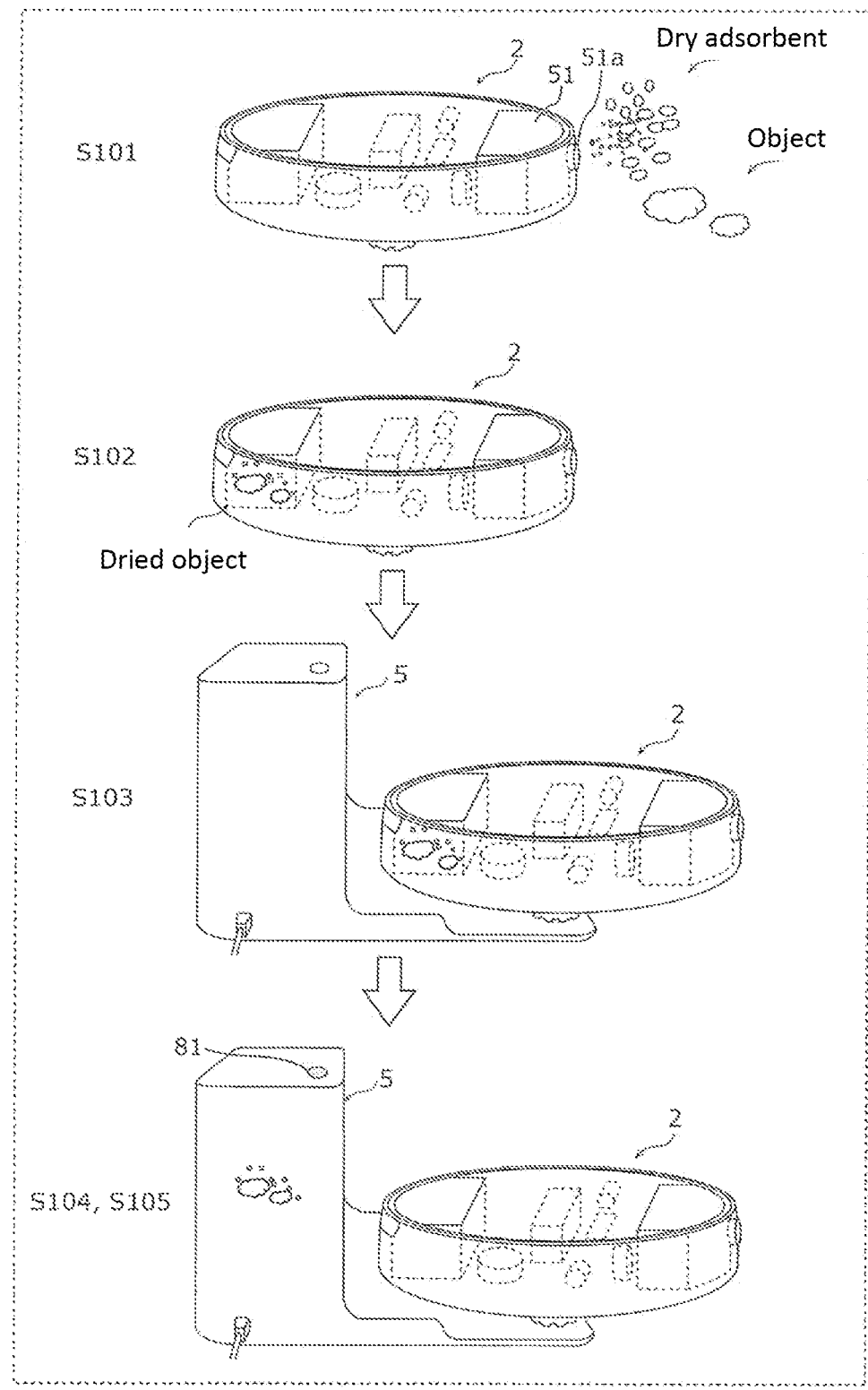
FIG. 8 shows a process diagram of the operation of the detection device according to the first embodiment.
Figure 10:
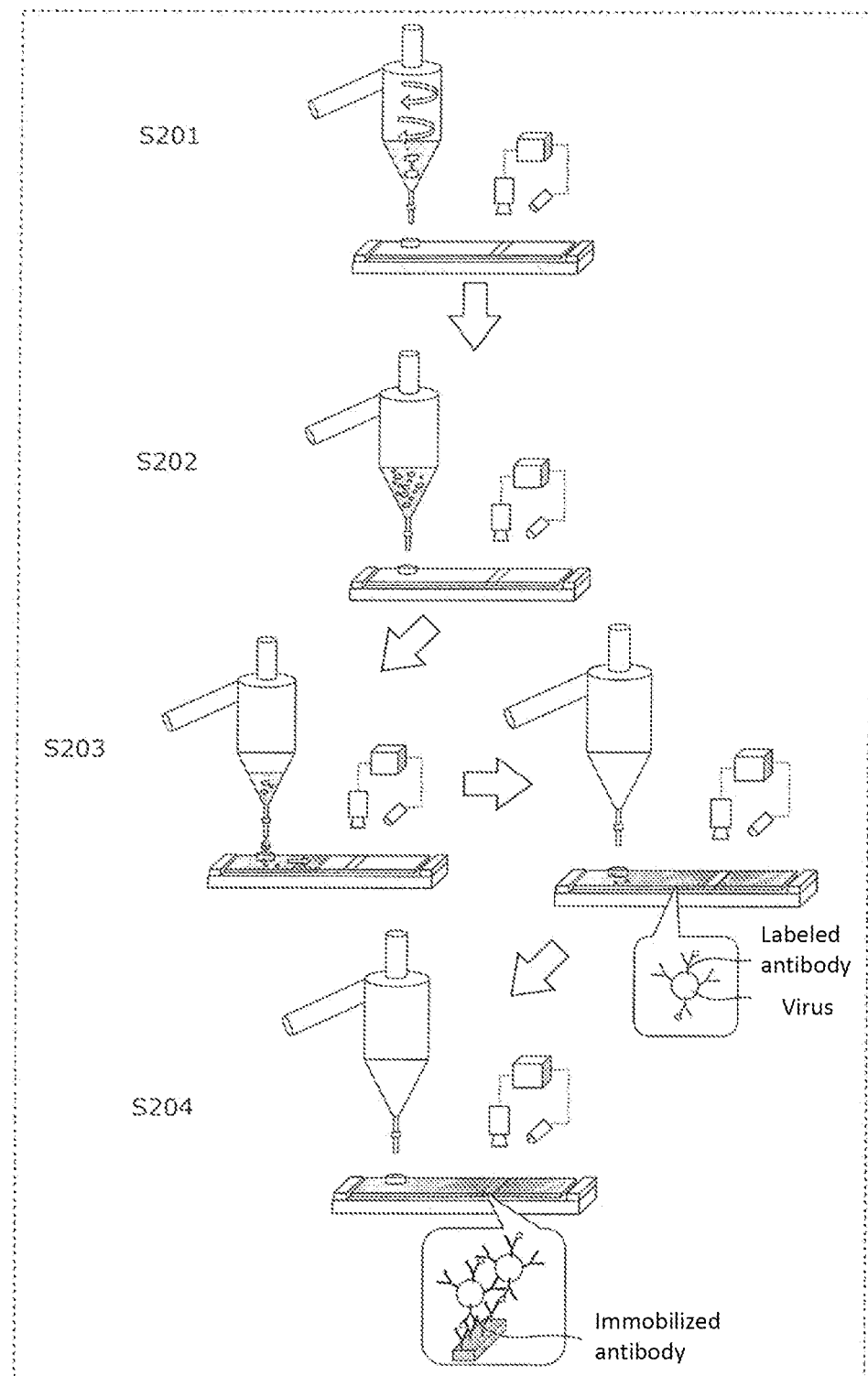
FIG. 10 shows a process diagram of the operation of the virus detection part according to the first embodiment.

Next, the inside of the virus detection part 68 will be described in detail with reference to FIG. 6. FIG. 6 shows a schematic diagram of the internal structure of the virus detection part according to the first embodiment.

The virus detection part 68 comprises the detection part housing 102, a separation part 105, an analysis device 110, and a determination part 111.

The detection part housing 102 has a substantially rectangular parallelepiped shape. The detection part housing 102 contains the separation part 105, the analysis device 110, and the determination part 111. The suction opening 101 to which the outlet 25c of the transfer pipe 25 is connected is provided on the side surface of the detection part housing 102. An opening to which the inlet 103a of the discharge pipe 103 is connected is provided on the top surface of the detection part housing 102.

The separation part 105 extracts a virus from the object transferred through the transfer pipe 25. Specifically, the separation part 105 comprises a cyclone part 106, an extraction part 107, an introduction pipe 108, and a valve 109.

The opening on the side surface of the cyclone part 106 is connected to the suction opening 101. The opening on the top surface of the cyclone part 106 is connected to the discharge pipe 103. Therefore, when the secondary electric blower 69 is activated, the object is sucked into the cyclone part 106 together with air from the dust container 12 of the autonomous collection device 2. The air and the object sucked into the cyclone part 106 are swirled in the cyclone part 106. As a result, the air is discharged to the upper discharge pipe 103, whereas the object falls to the extraction part 107, which is located downward. In this way, the object is separated from the air using the centrifugal force in the cyclone part 106. In place of using the secondary electric blower 69, the primary electric blower 13 of the autonomous collection device 2 may be reversely rotated to send air to the dust container 12 and to discharge the object from the dust container 12 to the station device 5.

The extraction part 107 extracts the virus from the object separated by the cyclone part 106 into an extraction liquid. The extraction part 107 is disposed below the cyclone part 106. The extraction liquid for extracting the virus is supplied in advance to the extraction part 107. The object separated by the cyclone part 106 falls into the extraction liquid in the extraction part 107. Then, a virus is extracted from the object with the extraction liquid. In this way, the sample liquid containing the extraction liquid, the object, and the virus is prepared in the extraction part 107.

The sample liquid is dropped onto the analysis device 110 through the introduction pipe 108. The introduction pipe 108 is connected below the extraction part 107.

The valve 109 is provided in the middle of the introduction pipe 108. The dropping of the sample liquid is controlled by opening and closing the valve 109.

The analysis device 110 analyzes the sample liquid. An example of the analysis device 110 is an immunochromatographic device. The virus is detected through a reaction that occurs in a liquid using the immunochromatographic device. Any sensor may be used as the analysis device 110. For example, a sensor using surface plasmon-field enhanced fluorescence spectroscopy may be used as the analysis device 110.

The determination part 111 determines the presence or absence of the virus on the basis of the analysis result provided using the analysis device 110. Specifically, the determination part 111 comprises an image sensor 112, a light emitting part 113, and a controller 114 for controlling the image sensor 112 and the light emitting part 113 and analyzing an image.

An example of the image sensor 112 is a solid-state imaging device such as a charge-coupled device (i.e., CCD) image sensor or a complementary metal-oxide semiconductor (i.e., CMOS) image sensor. An image of the analysis device 110 is captured using the image sensor 112.

The light emitting part 113 is a light source for irradiating the analysis device 110 with light.

The controller 114 controls the light emitting part 113 and the image sensor 112 in such a way that the light emitting part 113 irradiates the analysis device 110 with light and that the image sensor 112 captures an image of the analysis device 110. Further, the controller 114 analyzes the captured image. Specifically, the controller 114 determines the presence or absence of the virus by determining whether or not a red line is generated in the analysis device 110 on the basis of the image.

[Operation of Detection Device]

Next, the operation of the detection device 1 will be described with reference to FIG. 7 and FIG. 8.

FIG. 7 is a flowchart of the operation of the detection device according to the first embodiment. FIG. 8 shows a process diagram of the operation of the detection device according to the first embodiment. Hereinafter, with reference to FIG. 7 and FIG. 8, processing from the suction of the object from the floor surface by the autonomous collection device 2 to the virus analysis and determination by the station device 5 in the first embodiment will be described.

First, the autonomous collection device 2 autonomously moves on the floor surface and disperses the dry adsorbent onto the floor surface (S101). Specifically, the robot control part 17 controls the dry adsorbent dispersion means 52 to send air into the dry adsorbent container 51, thereby dispersing the dry adsorbent from the opening 51*a*. In place of using the dry adsorbent dispersion means 52, the dry adsorbent may be dispersed using the primary electric blower 13.

Next, the autonomous collection device 2 moves to the position where the dry adsorbent has been dispersed, and then sucks the object dried by the dry adsorbent (S102). Specifically, the robot control part 17 controls the primary electric blower 13 to generate the suction negative pressure. In this way, the object is sucked from the suction opening 36, and then the object dried by the drying part 18 is stored in the dust container 12.

Thereafter, the autonomous collection device 2 moves to the home position of the station device 5 (S103). As a result, the dust container 12 of the autonomous collection device 2 is fluidically connected to the transfer pipe 25 of the station device 5.

The station device 5 transfers the object stored in the dust container 12 of the autonomous collection device 2 to the cyclone part 106 of the virus detection part 68 (S104). Specifically, the control part 93 of the station device 5 controls the secondary electric blower 69 to suck the object from the dust container 12, thereby transferring the object together with air to the cyclone part 106 of the virus detection part 68.

The virus detection part 68 detects the virus contained in the object transferred from the dust container 12 of the autonomous collection device 2 (S105). Hereinafter, virus detection will be described in detail with reference to FIG. 9 and FIG. 10.

FIG. 9 is a flowchart of the operation of the virus detection part according to the first embodiment. FIG. 10 shows a process diagram of the operation of the virus detection part according to the first embodiment.

The cyclone part 106 separates the sucked object from the air (S201). Specifically, the cyclone part 106 separates the air and the object upward and downward, respectively, using the centrifugal force generated by suction of the secondary electric blower 69. In place of using the cyclone part 106, the object may be separated from the air through a filter.

The extraction part 107 extracts the virus from the separated object (S202). Specifically, the control part 93 stops the suction conducted by the secondary electric blower 69. The object separated by the cyclone part 106 is mixed with the extraction liquid supplied in advance to the extraction part 107. The virus is extracted from the mixture of the object and the extraction liquid.

The controller 114 drops the sample liquid onto the analysis device 110 (S203). Specifically, the controller 114 opens the valve 109 for a certain period of time and drops the sample liquid onto the analysis device 110. Further, the controller 114 closes the valve 109 after a certain time, and then moves, to an imaging region, the region of the analysis device 110 onto which the sample liquid has been dropped. The virus in the dropped sample liquid reacts with a labeled antibody on the analysis device 110. The labeled antibody is, for example, a colloidal gold labeled antibody.

The determination part 111 determines the presence or absence of the virus in the sample liquid (S204). Specifically, the controller 114 captures an image of the imaging region using the image sensor 112 and the light emitting part 113. An antibody is immobilized on the imaging region. The immobilized antibody binds to the virus that has reacted with the labeled antibody. As a result, a red line appears on the analysis device 110. Therefore, the controller 114 analyzes the captured image and determines whether or not the analysis device 110 has a red line. Here, if it is determined that the red line is present, the controller 114 determines that the sample liquid contains the virus. On the other hand, if it is determined that the red line is absent, the controller 114 determines that the sample liquid does not contain the virus. Thereafter, the controller 114 presents the determination result to the lamp 81.

Summary of First Embodiment

As described above, the detection device 1 according to the first embodiment comprises the autonomous collection device 2 and the station device 5. The autonomous collection device 2 autonomously moves on the floor surface and collects the object on the floor surface. The station device 5 detects the analyte from the object collected from the floor surface by the autonomous collection device 2. The autonomous collection device 2 comprises the moving part 15 for moving on the floor surface, the primary electric blower 13 for sucking the object on the floor surface, and the dust container 12 for storing the sucked object. The station device 5 comprises the transfer pipe 25 which is fluidically connected to the dust container 12 of the autonomous collection device 2 when the autonomous collection device 2 is located at the home position, and the virus detection part 68 for detecting the analyte from the object transferred from the dust container 12 through the transfer pipe 25.

Such a detection device 1 collects the object on the floor surface and detects the analyte from the collected object. Many of the secretions, including pathogens such as a virus spread in air by coughing or sneezing, fall onto the floor surface. In the first embodiment, the object on the floor surface is collected, and then the analyte is detected from the collected object. In this way, the analyte is allowed to be detected effectively.

In the detection device 1 according to the first embodiment, the virus detection part 68 includes the cyclone part 106 for separating the object from air using centrifugal force, and the extraction part 107 for extracting the analyte from the object separated by the cyclone part 106.

Thereby, the analyte is allowed to be easily extracted from the object transferred together with the air.

In the detection device 1 according to the first embodiment, the virus detection part 68 detects the analyte using a reaction that occurs in a liquid.

Thereby, the analyte is allowed to be detected using the liquid.

The station device 5 of the detection device 1 according to the first embodiment further comprises the lamp 81 for presenting the detection result provided by the virus detection part 68.

Thereby, the detection result is allowed to be presented quickly to a user, and the spread of the virus infection is allowed to be suppressed.

The autonomous collection device 2 collects the analyte from the floor surface on which the object having the analyte and moisture is present. The autonomous collection device 2 comprises the drying part 18 for drying the object, the primary electric blower 13 for sucking the object dried by the drying part 18, and the dust container 12 for storing the object sucked by the primary electric blower 13.

Thereby, the object which is difficult to suck due to water contained therein is allowed to be dried and then sucked. Therefore, it is possible to improve the ability to collect the object including the analyte, and to collect the analyte effectively.

In the autonomous collection device 2, the drying part 18 includes the dry adsorbent container 51 for storing the dry adsorbent for drying the object and the dry adsorbent dispersion means 52 for dispersing the dry adsorbent stored in the dry adsorbent container 51 on the floor surface.

Thereby, the dry adsorbent is allowed to be dispersed onto the floor surface, and the object on the floor surface is allowed to be dried with the dry adsorbent and then sucked. Therefore, it is possible to improve the ability to collect the object including the analyte, and to collect the analyte effectively.

Second Embodiment

Hereinafter, the second embodiment will be described. The second embodiment is different from the first embodiment in that the amount of the object to be transferred from the autonomous collection device 2 to the station device is adjusted.

[Details of Station Device]

Figure 11:
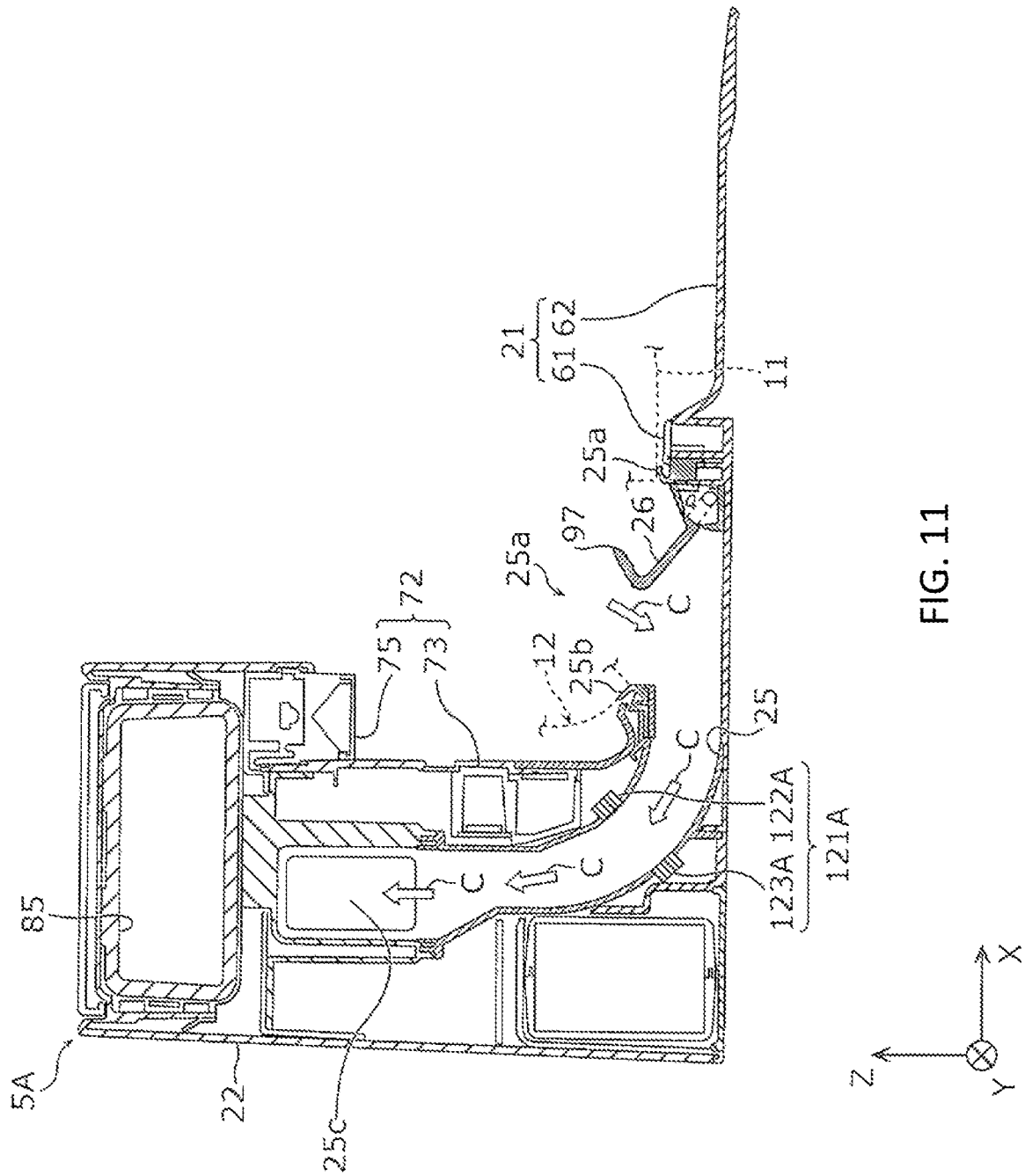
FIG. 11 shows a vertical cross-sectional view of the station device according to a second embodiment.

The station device will be specifically described with reference to FIG. 5A and FIG. 11. FIG. 11 shows a vertical cross-sectional view of the station device 5A according to the second embodiment.

As shown in FIG. 5A, the station device 5A according to the second embodiment comprises a control part 93A in place of the control part 93. Furthermore, as shown in FIG. 11, the station device 5A comprises a dust sensor 121A in the middle of the transfer pipe 25.

The dust sensor 121A detects the object being transferred through the transfer pipe 25. In the second embodiment, the dust sensor 121A comprises a light emitting element 122A for irradiating the inside of the transfer pipe 25 with light and a light receiving element 123A provided so as to face the light emitting element 122A. The light receiving element 123A outputs an electric signal having a level corresponding to the amount of received light to the control part 93A.

The control part 93A is one example of an adjustment part for adjusting the amount of the object transferred from the dust container 12 to the virus detection part 68. In the second embodiment, the control part 93A detects a temporal change in the amount of the light received by the light receiving element 123A that depends on the transfer amount of the object which passes between the light emitting element 122A and the light receiving element 123A on the basis of the electric signal input from the light receiving element 123A to measure the transfer amount of the object in the transfer pipe 25. The control part 93A stops the operation of the secondary electric blower 69 to stop the suction of the object from the dust container 12, when the measured transfer amount of the object exceeds a predetermined threshold amount. The predetermined threshold amount is determined based on the processing capability of the virus detection part 68.

[Details of Transfer Process]

Next, the operation of the station device 5A will be described. The basic operation of the station device 5A is the same as the operation in the first embodiment (see FIG. 7). Details of the object transfer process (S104) will be described below with reference to FIG. 12.

Figure 12:
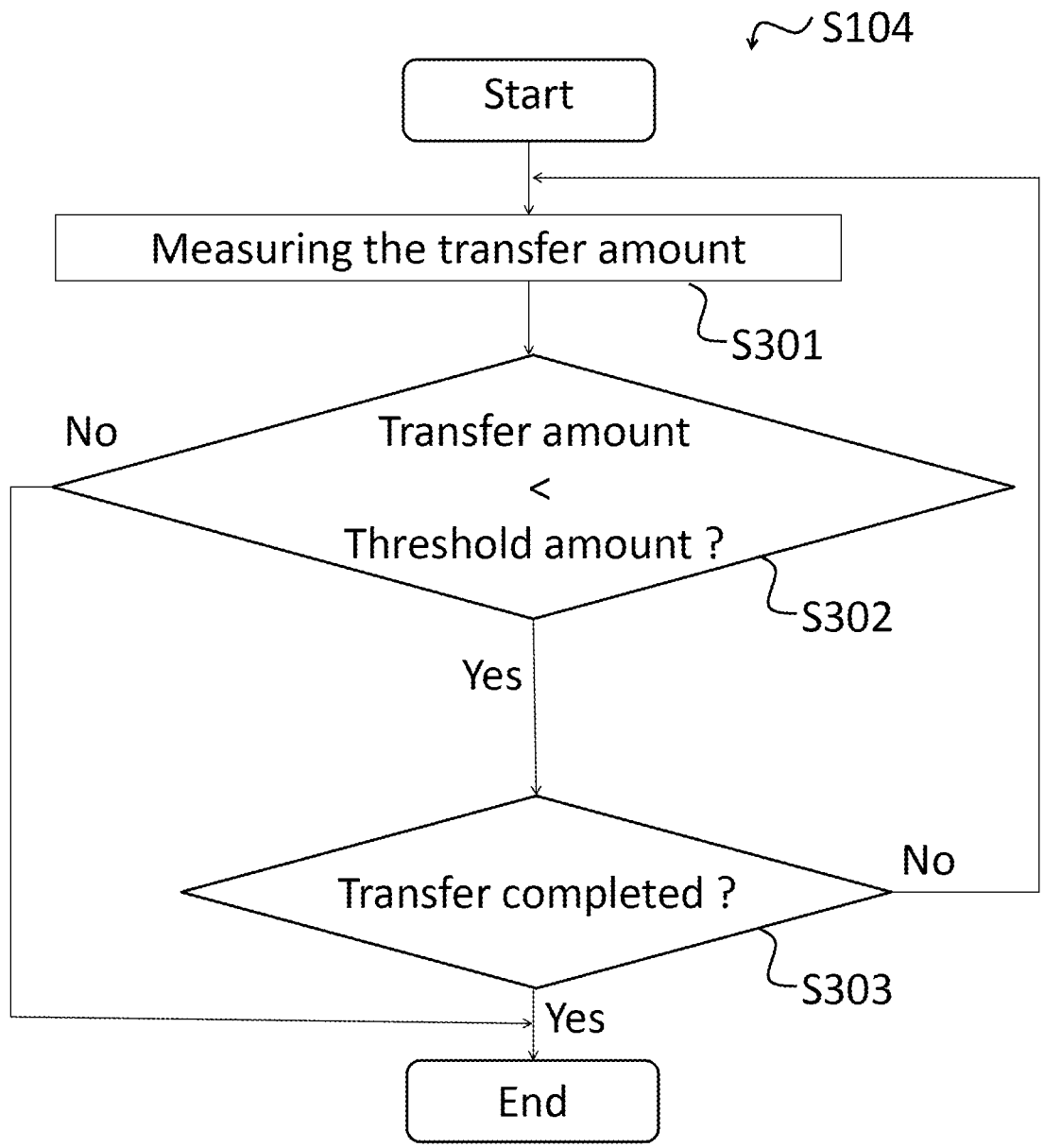
FIG. 12 is a flowchart of a transfer process of an object from the autonomous collection device according to the second embodiment to the station device.

FIG. 12 is a flowchart of a transfer process of the object in the second embodiment. Specifically, FIG. 12 shows details of the process of step S104 in the second embodiment.

First, the control part 93A measures the transfer amount of the object in the transfer pipe 25 based on the output signal output from the dust sensor 121A (S301). The control part 93A determines whether or not the measured transfer amount of the object is less than the threshold amount (S302).

If the transfer amount is equal to or greater than the threshold amount (No in S302), the control part 93A stops the suction conducted by the secondary electric blower 69 to complete the transfer process of the object.

On the other hand, if the transfer amount is less than the threshold amount (Yes in S302), the control part 93A determines whether or not to complete the transfer (S303). For example, the control part 93A determines whether or not to complete the transfer on the basis of at least one selected from the group consisting of a transfer time and the input signal from the autonomous collection device 2. For example, the control part 93A may determine whether or not to complete the transfer on the basis of a comparison result between an elapsed time from the start of the suction by the secondary electric blower 69 and a predetermined threshold time. Alternatively, the control part 93A may determine whether or not to complete the transfer on the basis of an input signal indicating that the dust container 12 is empty.

If it is determined that the transfer is not completed (No in S303), the control part 93A continues the suction conducted by the secondary electric blower 69 (return to S301). On the other hand, if it is determined that the transfer is completed (Yes in S303), the control part 93A stops the suction conducted by the secondary electric blower 69 to complete the transfer process of the object.

Summary of Second Embodiment

As described above, in the second embodiment, the station device 5A comprises the control part 93A for adjusting the amount of the object to be transferred from the dust container 12 to the virus detection part 68.

Thereby, the station device 5A does not have to transfer all the objects in the dust container 12 to the virus detection part 68, and can adjust an amount the object, depending on the capability of the virus detection part 68. Therefore, the virus detection part 68 can detect the analyte more effectively.

In the second embodiment, the transfer amount of the object is measured by a photoelectric sensor such as the light receiving element 123A. However, the transfer amount of the object may be measured by a method other than the method using the photoelectric sensor. For example, the transfer amount of the object may be measured by measuring a change in the weight of the virus detection part 68 using a weight sensor. In order to adjust the transfer amount, it is not necessarily needed to measure the transfer amount. For example, the transfer amount may be adjusted by controlling the transfer time. Specifically, for example, the secondary electric blower 69 may suck the object only for a predetermined time in a state where the object is sufficiently stored in the dust container 12.

Third Embodiment

Hereinafter, the third embodiment will be described. The third embodiment is different from the first embodiment in that the movement of the autonomous collection device on the floor surface and the collection of the object on the floor surface are started, when a sound generated when a human released the analyte is detected. In the present specification, the sound generated when a human releases the analyte is referred to as a "released sound".

[Details of Autonomous Collection Device]

FIG. 13 shows a schematic diagram of an autonomous collection device 2B in the third embodiment. The autonomous collection device 2B comprises a microphone 131B on the top surface of the main body case 11.

The microphone 131B converts sound into an electric signal. The microphone 131B outputs the electric signal to the robot control part 17B.

The robot control part 17B processes the output signal of the microphone 131B to detect a released sound generated when a human releases the virus. The released sound is, for example, a cough or sneeze sound. For example, the robot control part 17B detects the released sound by analyzing the output signal of the microphone 131B on the basis of the frequency thereof. The method for detecting the released sound is not limited.

When the robot control part 17B detects the released sound, the robot control part 17B controls the moving part 15 to start the movement of the autonomous collection device 2B on the floor surface and the collection of the object on the floor surface. For example, when the robot control part 17B detects the released sound in a state where the robot control part 17B is located at the home position, the robot control part 17B starts moving from the home position.

Summary of Third Embodiment

As described above, in the third embodiment, the autonomous collection device 2B comprises the microphone 131B for detecting the released sound generated when the human releases the analyte and the robot control part 17B. When the robot control part 17B detects the released sound through the microphone 131B, the robot control part 17B controls the moving part 15 to start the movement of the autonomous collection device 2B on the floor surface and the collection of the object.

Thereby, when the coughing or sneezing sound is detected, the autonomous collection device 2B starts the collection of the object. Therefore, after the secretion containing the analyte is scattered on the floor surface, the analyte is allowed to be quickly collected from the floor surface. In this way, the analyte can be detected more effectively.

The microphone 131B may include a plurality of directional microphones each having directivity. In this case, the robot control part 17B may detect a direction in which the released sound is generated by comparing the output signals of the plurality of directional microphones. Then, the robot control part 17B may move the autonomous collection device 2B in the detected direction.

Fourth Embodiment

Hereinafter, the fourth embodiment will be described. The fourth embodiment is different from the first to third embodiments in that air is blown to the object on the floor surface in order to dry the object on the floor surface.

[Details of Autonomous Collection Device]

Figure 14:
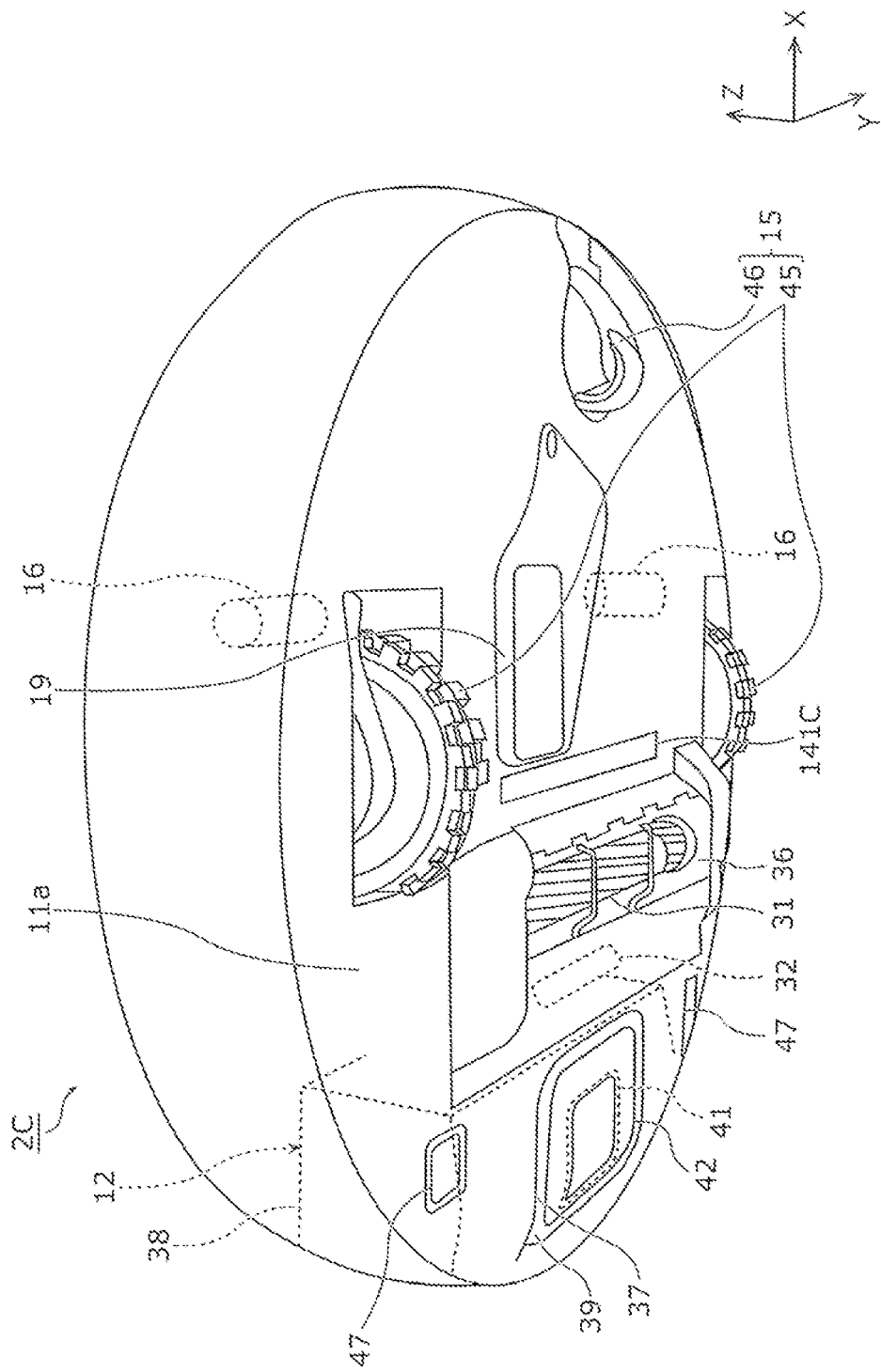
FIG. 14 shows a schematic diagram of a bottom surface of the autonomous collection device according to a fourth embodiment.

FIG. 14 shows a schematic diagram of the bottom surface of an autonomous collection device 2C according to the fourth embodiment. As shown in FIG. 14, the bottom surface 11a of the main body case 11 comprises the suction opening 36 and a blowing opening 141C.

The blowing opening 141C is one example of a drying part, as well as one example of a first blowing part for drying the object by blowing air to the object on the floor surface. The blowing opening 141C doubles as an exhaust opening through which air sucked together with the object from the suction opening 36 is discharged. In other words, at least a part of the air sucked from the suction opening 36 is discharged from the blowing opening 141C and is blown to the object on the floor surface. Thereby, the object on the floor surface is sucked from the suction opening 36 after being dried.

Summary of Fourth Embodiment

As described above, in the fourth embodiment, the autonomous collection device 2C is provided in front of the suction opening 36 for sucking the object. The autonomous collection device 2C includes the blowing opening 141C for drying the object by blowing air to the object on the floor surface.

In the autonomous collection device 2C according to the fourth embodiment, air can be blown to the object on the floor surface to dry it, and then the object is sucked. Therefore, it is possible to improve the ability to collect the object including the analyte, and to collect the analyte effectively.

In the fourth embodiment, the blowing opening 141C doubles as the exhaust opening through which air sucked together with the object from the suction opening 36 is discharged.

Thereby, the object can be dried using the exhaust gas generated by the intake air for sucking the object. Therefore, it is not necessary to provide a dedicated electric blower for drying, and the configuration of the autonomous collection device 2C can be simplified.

Fifth Embodiment

Hereinafter, the fifth embodiment will be described. The fifth embodiment is different from the first to fourth embodiments in that air is blown to the brush to dry the object attached to the brush.

[Details of Autonomous Collection Device]

Figure 15:
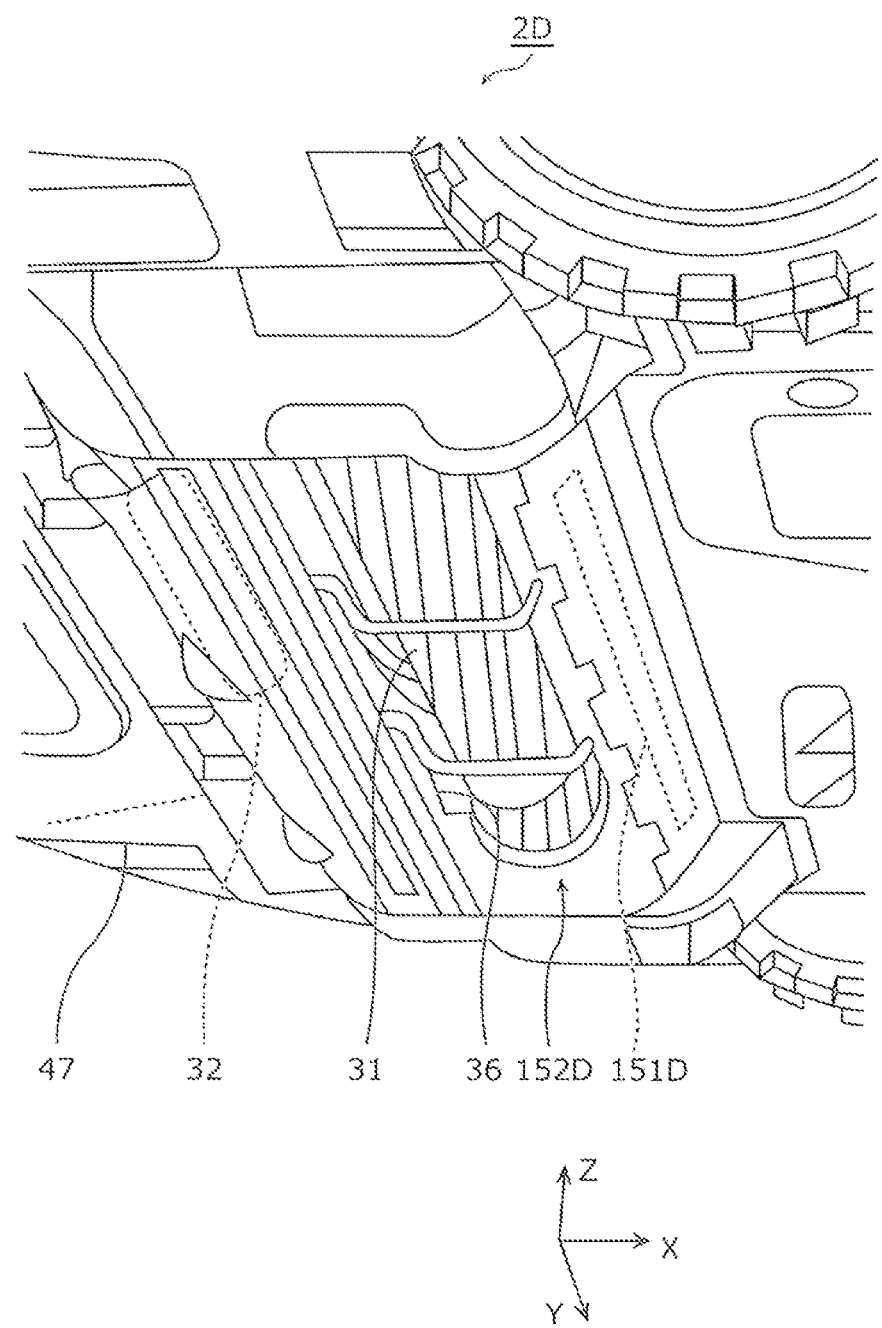
FIG. 15 shows a partially enlarged diagram of the bottom surface of the autonomous collection device according to a fifth embodiment.
Figure 16:
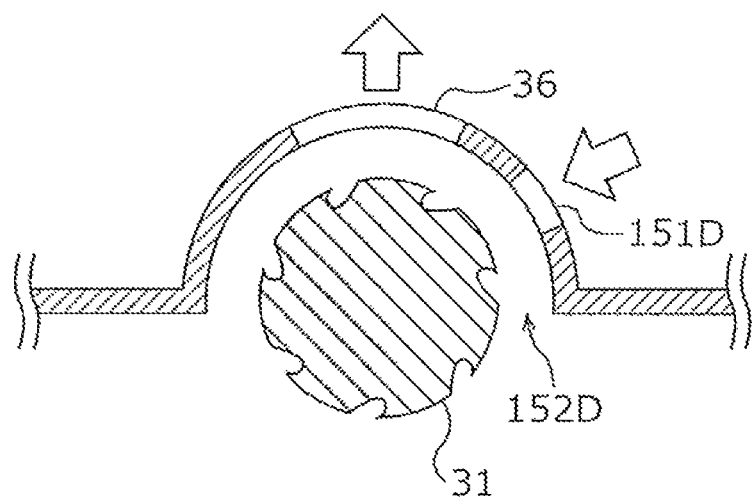
FIG. 16 shows a cross-sectional view of a suction opening, a blowing opening, and a vicinity thereof which are included in the autonomous collection device according to the fifth embodiment.

FIG. 15 shows a schematic diagram of the bottom surface of an autonomous collection device 2D in the fifth embodiment. FIG. 16 shows a cross-sectional view of the suction opening 36, a blowing opening 151D, and the vicinity thereof which are included in the autonomous collection device 2D in the fifth embodiment.

As shown in FIG. 15 and FIG. 16, a center brush 31 is provided in the vicinity of the suction opening 36 on the bottom surface 11a of the main body case 11. In the fifth embodiment, the bottom surface 11a of the main body case 11 is provided with a recess part 152D. A part of the center brush 31 is contained in the recess part 152D. The suction opening 36 and the blowing opening 151D are provided in the recess part 152D.

The blowing opening 151D is one example of a drying part, as well as one example of a second blowing part for drying the object attached to the center brush 31 by blowing air on the center brush 31. The blowing opening 151D doubles as the exhaust opening through which the air sucked together with the object from the suction opening 36 is discharged. In other words, at least a part of the air sucked from the suction opening 36 is discharged from the blowing opening 151D and blown to the center brush 31. As a result, the object attached to the center brush 31 is dried and then sucked from the suction opening 36. In the fourth embodiment and the fifth embodiment, the blowing opening may be provided separately from the exhaust opening.

Summary of Fifth Embodiment

As described above, in the fifth embodiment, the autonomous collection device 2D comprises the center brush 31 provided in the vicinity of the suction opening 36 through which the object is sucked, and the blowing opening 151D through which air is blown to the center brush 31 for the drying of the object attached to the center brush 31.

In the fifth embodiment, the object containing moisture attached to the center brush 31 can be dried. Therefore, the object attached to the center brush 31 can be easily sucked from the suction opening 36, the ability to collect the object including the analyte can be improved, and the analyte can be effectively collected.

In the fifth embodiment, the blowing opening 151D doubles as an exhaust opening through which the air sucked by the primary electric blower 13 together with the object is discharged.

Thereby, the object can be dried using the exhaust gas generated by the intake air for sucking the object. Therefore, it is not necessary to provide a dedicated electric blower for drying, and the configuration of the autonomous collection device 2D can be simplified.

Sixth Embodiment

Hereinafter, the sixth embodiment will be described. In the sixth embodiment, the station device comprises a storage part for storing the object between the dust container of the autonomous collection device and the virus detection part.

Figure 5B:
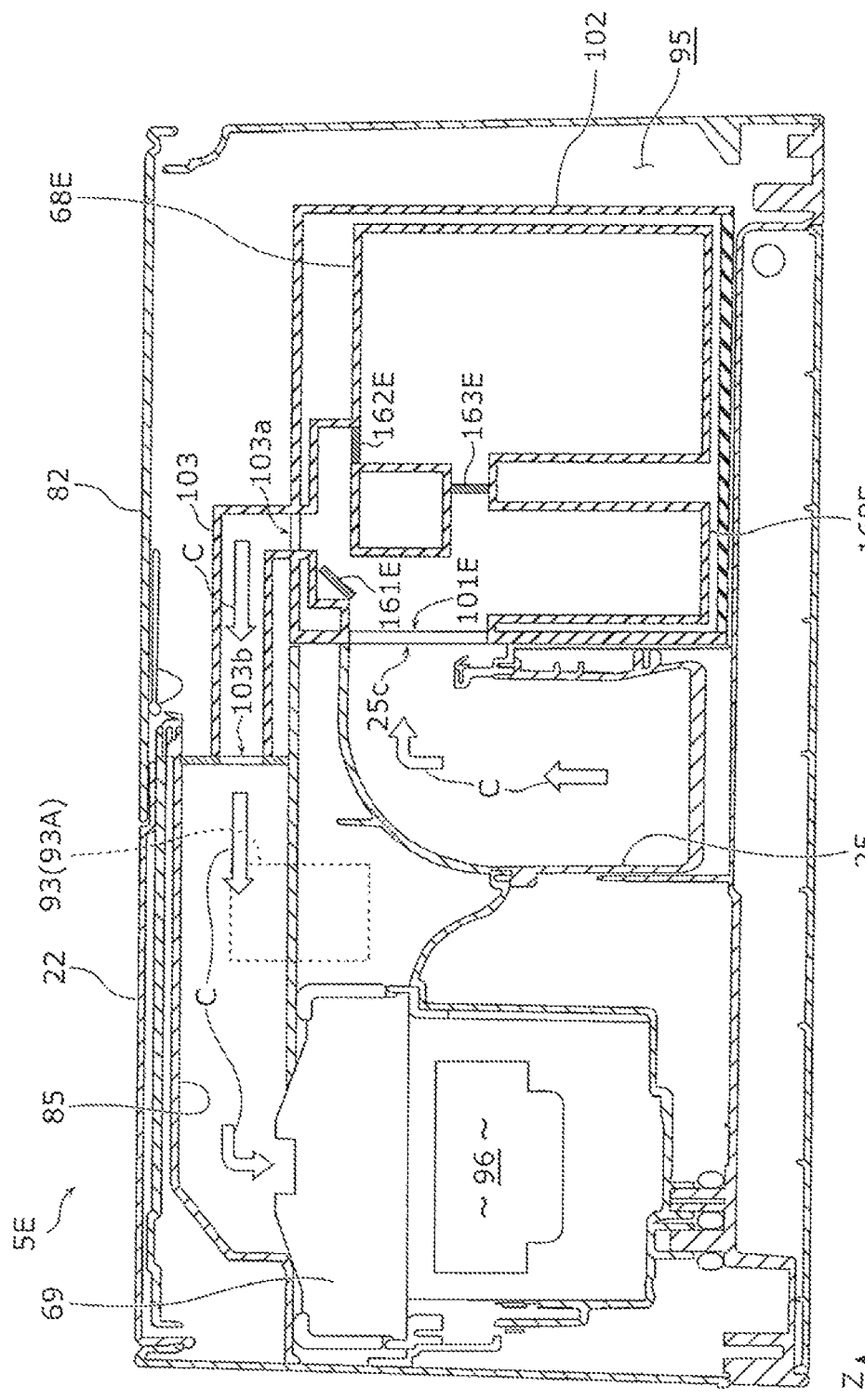
FIG. 5B shows a transverse cross-sectional view of the station device according to a sixth embodiment.

FIG. 5B shows a transverse cross-sectional view of a station device 5E according to the sixth embodiment. The station device 5E comprises a storage part 160E, a virus detection part 68E, and valves 161E to 163E. The storage part 160E has a suction opening 101E to which the outlet 25c of the transfer pipe 25 is connected. The storage part 160E is connected to the discharge pipe 103 through the valve 161E. The storage part 160E is connected to the virus detection part 68E through the valve 163E. The virus detection part 68E is connected to the discharge pipe 103 through the valve 162E. The control part 93 opens the valve 161E, closes the valves 162E and 163E, and then operates the secondary electric blower 69 to transfer the object from the dust container 12 of the autonomous collection device 2 to the storage part 160E. Thereafter, the control part 93 closes the valve 161E, opens the valves 162E and 163E, and then operates the secondary electric blower 69 to transfer the object from the storage part 160E to the virus detection part 68E. In this way, the station device 5E can temporarily store the object transferred from the autonomous collection device 2 in the storage part 160E, and effectively detects the virus, depending on the processing capability of the virus detection part 68E.

(Others)

Several embodiments of the present disclosure have been described above. These embodiments are presented as examples and are not intended to limit the scope of the invention. These novel embodiments are allowed to be implemented in various other forms. Various omissions, replacements, and changes can be made without departing from the scope of the invention. These embodiments and modifications thereof are included in the scope and gist of the invention, and are included in the invention described in the claims and the equivalents thereof.

In each of the above embodiments, the autonomous collection part is provided with means for drying the object; however, such means may not necessarily be provided. For example, the autonomous collection part does not have to comprise the dry adsorbent container 51, the dry adsorbent dispersion means 52, and the blowing openings 141C and 151D. Even in this case, the detection device can collect the object on the floor surface and detect the analyte from the collected object.

INDUSTRIAL APPLICABILITY

In order to decrease the risk of the virus infection to people staying in the room, the present disclosure provides a detection device which collects the object of saliva discharged on the floor surface by coughing or sneezing, and detects the virus from the object.

REFERENTIAL SIGNS LIST

1 Detection device
2, 2B, 2C, 2D Autonomous collection device
3 Charging electrode
5, 5A, 5E Station device
11 Main body case
11a Bottom surface
12 Dust container
13 Primary electric blower
15 Movement part
16 Drive part
17, 17B Robot control part
18 Drying part
19 Secondary battery
21 Pedestal
22 Housing
25 Transfer pipe
25a Inlet
25b Sealing member
25c Outlet
26 Lever
29 Power cord
31 Center brush
32 Center brush drive part
36 Suction opening
37 Dust container opening
38 Container main body
39 Connection part
41 Disposal opening
42 Disposal lid
45 Pair of drive wheels
46 Turning wheel
47 Charging terminal
51 Dry adsorbent container
51a Opening
52 Dry adsorbent dispersion means
61 High floor surface part
62 Low floor surface part
68 Virus detection part
69 Secondary electric blower
71 Recess part
72 Detection part
73 First sensor part
75 Second sensor part
81 Lamp
82 Lid
85 Downstream pipe
93, 93A Control part
95 Detection part chamber
96 Blower chamber
97 Hook
101, 101E Suction opening
102 Detection part housing
103 Discharge pipe
103a Inlet
103b Outlet
105 Separation part
106 Cyclone part
107 Extraction part
108 Introduction pipe
109, 161E, 162E, 163E Valve
110 Analysis device
111 Determination part
112 Image sensor
113 Light emitting part
114 Controller
121A Dust sensor
131B Microphone
141C, 151D Blowing opening
152D Recess part
160E Storage part

The invention claimed is:

1. A device, comprising:
a collection device capable of autonomously moving on a floor surface and for collecting an object on the floor surface; and
a detector for detecting an analyte from the object collected from the floor surface by the collection device, wherein
the collection device comprises:
   a moving mechanism for moving on the floor surface,
   a suction part for sucking the object on the floor surface; and
   a storage part for storing the object sucked by the suction part, and
the detector comprises:
   a substance detection part for detecting the analyte from the object transferred from the storage part; and a transmittance part for transmitting a detection result to another device other than the detector, the detection result being generated by the substance detection part.

2. A device, comprising:
a collection device capable of autonomously moving on a floor surface and for collecting an object on the floor surface; and
a detector for detecting an analyte from the object collected from the floor surface by the collection device, wherein
the collection device comprises:
  a moving mechanism for moving on the floor surface,
  a suction part for sucking the object on the floor surface; and
  a storage part for storing the object sucked by the suction part, and
the detector comprises:
  a substance detection part for detecting the analyte from the object transferred from the storage part; and
  a presentation part for presenting a result of detection conducted by the substance detection part.

\* \* \* \* \*